Oct. 23, 1962 R. FAVRE 3,060,334

MECHANICAL OSCILLATOR

Filed Nov. 13, 1959

INVENTOR
Robert Favre
BY Imirie & Smiley
ATTORNEYS 3,060,334
Patented Oct. 23, 1962

3,060,334

MECHANICAL OSCILLATOR

Robert Favre, Lausanne, Switzerland, assignor to Fabriques Movado, La Chaux-de-Fonds, Switzerland
Filed Nov. 13, 1959, Ser. No. 852,831
Claims priority, application Switzerland Nov. 21, 1958
1 Claim. (Cl. 310—38)

The present invention relates to an oscillator and particularly to an oscillator having a body mounted on a support in overhung position to perform circular oscillations around an axis of symmetry.

Most of the time-measuring apparatus have an oscillator as a time basis. A particular and prevalent kind of such oscillators comprises a balance and a hairspring and is characterised by a low frequency of oscillation allowing the maintenance of the oscillations on a purely mechanical way. However, in such oscillators, the presence of bearing pivots as a friction source results in disturbances in the isochronism which, among other reasons, justify in time-measuring apparatus of high precision the replacement of balance and hairspring by a piezoelectric oscillator or a tuning fork. However, at the actual state of the art such oscillators can only be considered for use in wrist watches if their frequency is low enough for directly driving a horological synchronous motor. It is practically almost impossible to manufacture small piezoelectric oscillators of very low frequency, and tuning forks fulfilling the said condition are very sensitive to shocks and very difficult to put into practice.

A prior oscillator has a beam serving as a balance and carrying adjustable weights for regulating the period of oscillation. The said beam is fixed to the one end of a torsion rod whose other end is rigidly secured to a support. The cross-section of the torsion rod is cruciform. This cross-shape is obtained by milling the rod in its longitudinal direction. That prior oscillator has, therefore, no bearing pivots and allows of obtaining frequencies in the order of 25 oscillations per second (i.e. 50 single vibrations). However, this oscillator has some serious drawbacks. The active length of the torsion rod, i.e., the length of the longitudinal milled recesses is not exactly determined and the thickness of the arms of the cruciform cross section of the torsion rod is not uniform. Moreover, this prior oscillator cannot be manufactured with dimensions allowing its utilisation in wrist watches.

One of the objects of this invention is to provide an oscillator allowing to avoid the inconveniences set out above.

Another object of the invention is to provide an oscillator allowing circular oscillations of an oscillating body mounted in overhung position while acting against translatory movement of said body.

Another object of the invention is to provide an oscillator in which the oscillating body is mounted on its support by means of at least two flat band-shaped return springs of uniform thickness, said return springs lying in different planes intersecting along the axis of oscillation of said body and uniformly distributed around said axis.

Another object of the invention is to provide an oscillator in which said return springs are held in settings by means of sectors.

Another object of the invention is to provide an oscillator in which each end of said return springs is firmly embedded between said sectors on at least two points.

Another object of the invention is to provide an oscillator in which a multipolar magnet carried by said oscillating body cooperates with a coil to obtain the electromagnetic interaction necessary for maintaining the oscillations of the body.

Another object of the invention is to provide an oscillator in which a ferromagnetic means allows of an easy adjustment of the frequency of oscillation.

Another object of the invention is the utilization of the oscillator in a watch movement, particularly, but not exclusively, in a wrist watch movement.

Other objects, features and advantages of the invention will be apparent as the following description proceeds, reference being had to the accompanying drawings, in which FIG. 1 is a perspective view of an example of performance of the invention;

Referring now to FIGS. 1 to 4, the oscillator has an oscillating body 1 mounted in overhung position on a support 2, such as, for instance, on the pillar plate of a watch, the body 1 performing circular oscillations around an axis of symmetry. The oscillating body 1 is mounted on the support 2 by means of three flat band-shaped return springs 3 of uniform thickness. These springs 3 lie in different planes intersecting along the axis of rotation or oscillation of the body 1. The springs 3 are uniformly distributed around that axis, that is, they are displaced relatively to each other by an angle of 120°. As may be seen from FIGS. 1 and 2, the springs 3 do not completely extend to the axis of oscillation but are at a radial distance therefrom. The described and illustrated arrangement of the springs 3 with regard to the axis of oscillation results in a small return or restoring moment on torsion of the system around the axis of oscillation, and in a great return moment in case of flexure of the system with regard to the axis of oscillation.

Figure 1:
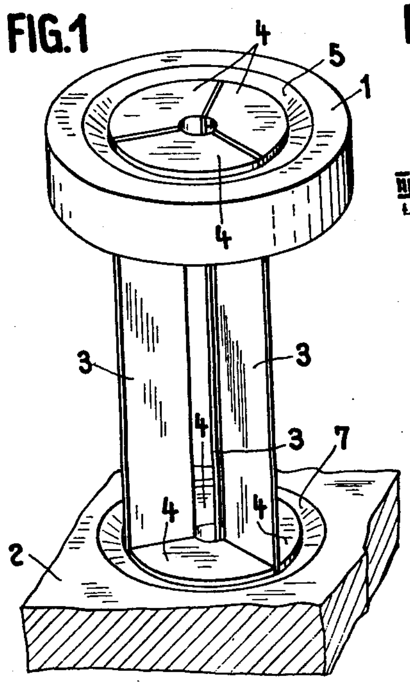
Figure 2:
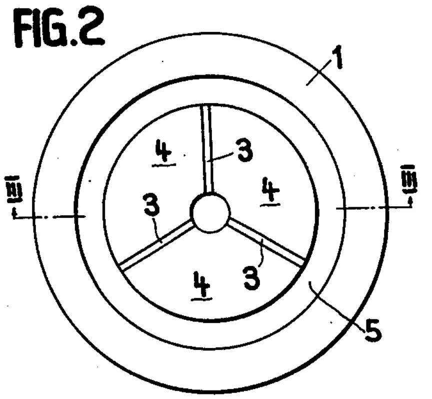
FIG. 2 is, on a larger scale, a top view of the oscillator according to FIG. 1.
Figure 3:
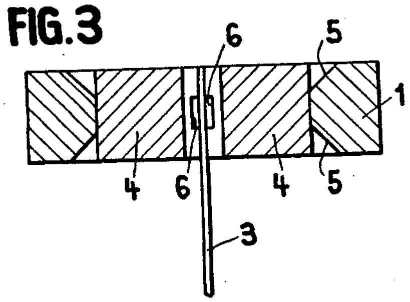
FIG. 3 is a sectional view taken along the line III—III in FIG. 2.

The upper ends of the springs 3 are embedded or clamped fast between sectors 4 made from steel of high strength, these sectors 4 being held or forced into a metallic setting constituted by the oscillating body 1 itself. By suitably shaping the sectors 4 and the setting 1 the ends of the springs 3 may be clamped between the sectors 4 in such a way that the desired active length of the springs 3 may be obtained very accurately. For reaching this aim the setting or body 1 has two chamfers 5 and the radial faces of the sectors 4 have, about in the middle of their thickness, radial grooves 6 going through the entire length of the radial faces. Therefore, the pressure exerted by the middle portion of the setting 1 lying between the chamfers 5 on to the middle portion of the height of the sectors 4, is distributed on the portions of the sectors 4 and the springs 3 lying above and below the grooves 6 (FIG. 3). In this way, a strong embedding or clamping of the upper ends of the springs 3 in at least two points is guaranteed. Corresponding means for anchoring or embedding the springs 3 are provided at the other end of the springs with the difference that the setting 1 is replaced by the support 2, that is, for instance by the pillar plate of a watch, the plate 2 having chamfers 7 corresponding to the chamfers 5. Sectors 4 are driven into the support 2 in the same manner as into the setting 1. In FIG. 1 only the upper chamfer 7 is visible. In a modified performance, also at the lower end of the springs 3 a setting of the shape of the body 1 with sectors forced therein may be used and the setting may, e.g., be forced into a correspondingly shaped recess of the support 2.

The number of the springs 3 may be different from three. As an example, two spring sheets may be used each having a middle slot extending almost all over the height of the sheets, the slot of one sheet opening towards the top and the slot of the other sheet towards the bottom. The slotted sheets are then fitted into each other within reach of their slots, so that the non-slotted end of each sheet lies in the open end of the slot of the other sheet. The interlocked sheets include right angles between them and thus form together a cross. This performance is equivalent to one with four individual springs 3 displaced at right angles relatively to each other.

The maintenance of the oscillations of the body 1 may be obtained by any one of the classic, well-known means. For the described and illustrated example, for instance, an electromagnetic means is especially well suited in that such means allows of obtaining an oscillator of very small dimensions and provides the oscillator with the advantages of the symmetry of a body of revolution. For this purpose the oscillating body 1 carries a multipolar cylindrical or disc-shaped magnet 8 (FIG. 4) which, in reach of the poles of the magnet 8, is surrounded by a cylindrical, preferably coaxial coil (not shown) providing in a well-known manner for the electromagnetic connection or correlation maintaining the oscillations.

Figure 4:
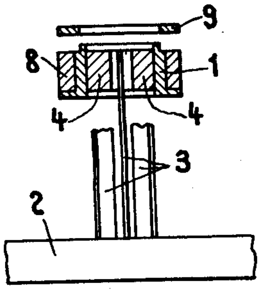
FIG. 4 is, on a smaller scale, a partially sectional side elevation of the oscillator illustrated in FIGS. 1 to 3, and FIGS. 5 and 6 illustrate two different manners of dynamically equilibrating oscillating systems comprising two oscillators according to the invention.

For adjusting the frequency of oscillation there is a ferromagnetic ring 9 perfectly coaxial to the axis of oscillation, this ring being fixed to the body 1, 8 solely by its interaction with the multipolar magnet 8, that is solely by magnetic attraction. In FIG. 4 the ring 9 is shown at a distance from the body 1, 8. This position is, of course, different from the real position of the ring 9 and merely serves to indicate that the ring 9 may easily be lifted off in order to modify its thickness or its diameter and thereby to alter the moment of inertia of the system 1, 4, 8 and 9 for adjusting the frequency of oscillation. The usually very small modifications of the ring 9 necessary for frequency adjustment may for instance be obtained by grinding the surface of the ring 9.

Another possibility of frequency adjustment would be the provision of several interchangeable rings 9 whose dimensions vary little from ring to ring. For adjusting the frequency, a ring of the set has merely to be replaced by another ring of the set; this other ring may, if necessary, be slightly retouched, for instance by grinding previous to its insertion.

Figure 5:
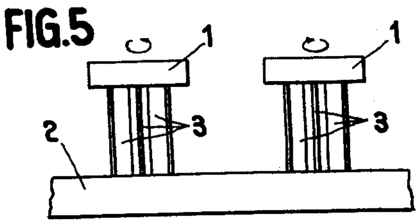

In order to reduce damping of the oscillations as far as ever possible dynamic balancing of the oscillating system may be obtained in the manner shown in FIG. 5 by providing two oscillators according to the invention, working at a phase displacement of the angle $\pi$ and placed side by side on the support 2 which may be the pillar plate of a watch movement, for instance, of a wrist watch.

Figure 6:
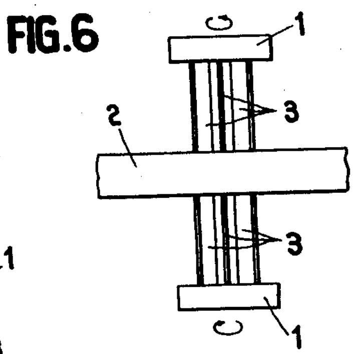

For the same purpose of dynamic balancing the oscillators may be arranged as illustrated in FIG. 6 where two oscillators according to the invention are placed along the same geometrical axis on opposite sides of the support 2 which, here too, may for instance be the pillar plate of a watch movement.

A fundamental advantage of the invention resides in the possibility of obtaining very small oscillators without undue increase of the frequency. This progress is due to the fact that the springs 3 can be manufactured at a high precision with classic methods well-known to those skilled in the art and also due to the fact that by mounting the springs in the manner according to the invention the active length of the springs can be determined very accurately. Therefore, oscillators according to the invention can be used in watches and, in particular, even in wrist watches.

While the invention has been described and illustrated with reference to specific embodiments thereof it will be understood that other embodiments may be resorted to without departing from the invention. Therefore, the performance of the invention set out above should be considered as illustrative and not as limiting the scope of the following claim.

I claim:

An electro-mechanical time-base, comprising a support, a pair of mechanical oscillators each including a body mounted on said support in overhung position to perform circular oscillations around an axis of symmetry under the action of a device adapted to maintain the oscillations of said body, and at least two flat band-shaped return springs of uniform thickness mounting said body on said support, said return springs lying in different planes intersecting along the axis of oscillation of said body and uniformly distributed around said axis, said return springs being embedded at their one end in said body and at their other end in said support so that their active length is exactly delimited, said pair of oscillators being arranged so as to assure a dynamic balancing of the oscillating system and, therefore, a high stability of the frequency of the oscillation.

References Cited in the file of this patent

UNITED STATES PATENTS

| | | |
|---|---|---|
| 2,238,380 | Almen | Apr. 15, 1941 |
| 2,815,477 | Dunn et al. | Dec. 3, 1957 |
| 2,819,892 | Huff | Jan. 14, 1958 |